UNITED STATES PATENT OFFICE.

FREDERICK HERMAN HUBBARD, OF BROOKLYN, NEW YORK, ASSIGNOR TO HIMSELF AND HENRY M. PIERSON, OF SAME PLACE.

SUPPOSITORY FOR CATARRH.

SPECIFICATION forming part of Letters Patent No. 298,855, dated May 20, 1884.

Application filed January 25, 1884. (No specimens.)

*To all whom it may concern:*

Be it known that I, FREDERICK HERMAN HUBBARD, of Brooklyn, in the county of Kings and State of New York, have invented an Improved Suppository for Catarrh, &c., of which the following is a specification.

This suppository is to act as a powerful local antiseptic with a soothing healing effect upon the mucous membrane forming the lining of any of the natural cavities of the body, such as the rectal, vaginal, nasal, or urethral cavities. The materials are to be mixed together and molded into a convenient size and shape for introduction into the cavity, so as to be brought directly into contact with the membrane at the place where the desired remedial effect is to be produced.

I make use of the following ingredients in about the proportion named: powdered iodoform, one-half dram; geranium, either powdered or solid extract, fifteen grains; carbolic acid, ordinary strength, fifteen drops; a fatty vehicle, one ounce; gum-arabic, in solution, ten grains.

For the fatty vehicle I prefer to use cosmoline, one-half ounce; cocoa-butter, one-fourth ounce; mutton-tallow, one-fourth ounce.

The proportion of gum-arabic may be varied to increase or lessen the consistency of the mixture.

The ingredients are to be intimately mixed in the presence of sufficient heat to melt the fatty materials, and then the compound is turned into molds of the proper sizes to form the suppositories. This should be done with rapidity, to prevent the loss of the volatile materials.

These suppositories will be found to possess sufficient consistency to be passed directly into the cavity, and they gradually melt and dissolve in contact with the mucous membrane and act to allay inflammation or irritation and promote a healthful condition.

I am aware that the ingredients of my composition have been separately used in suppositories; also that carbolic acid and catechu have been, as have iodoform and cocoa-butter; but I find that when all the substances are combined, as specified, I obtain from the mixture a result which I have been unable otherwise to produce.

I claim as my invention—

The suppository composed of iodoform, geranium, carbolic acid, gum, and a fatty vehicle, substantially as set forth.

Signed by me this 21st day of January, A. D. 1884.

F. H. HUBBARD.

Witnesses:
GEO. T. PINCKNEY,
WILLIAM G. MOTT.